United States Patent [19]
Bitterli et al.

[11] 4,253,153
[45] Feb. 24, 1981

[54] ENERGY CONSERVATIVE CONTROL OF TERMINAL REHEAT HEATING, VENTILATING, AND AIR CONDITIONING (HVAC) SYSTEMS

[75] Inventors: William W. Bitterli, Simsbury; John E. Games, Granby, both of Conn.; David M. Healey, Feeding Hills, Mass.

[73] Assignee: United Technologies Corporation, Hartford, Conn.

[21] Appl. No.: 52,701

[22] Filed: Jun. 28, 1979

Related U.S. Application Data

[63] Continuation of Ser. No. 836,118, Sep. 23, 1977, abandoned.

[51] Int. Cl.³ .................. F24F 3/00; G06F 15/46
[52] U.S. Cl. ..................... 364/505; 165/16; 165/22; 165/26; 364/118
[58] Field of Search ............. 364/118, 505; 318/609, 318/610; 165/12, 13, 16, 22, 26, 30; 236/1 B, 1 C, DIG. 8

[56] References Cited

U.S. PATENT DOCUMENTS

| | | | |
|---|---|---|---|
| 3,826,305 | 7/1974 | Fishman | 165/26 |
| 3,834,617 | 9/1974 | Dyntar | 236/1 C |
| 3,949,807 | 4/1976 | Tyler | 165/16 |
| 3,951,205 | 4/1976 | Zilbermann | 165/22 X |
| 3,979,922 | 9/1976 | Shavit | 165/16 X |
| 4,013,118 | 3/1977 | Zimmer et al. | 165/22 |

Primary Examiner—Jerry Smith
Attorney, Agent, or Firm—Dominic J. Chiantera

[57] ABSTRACT

A terminal reheat HVAC system which regulates the temperature in a plurality of temperature controlled spaces by modulating the temperature of cool discharge air presented to each of the spaces from an air handler source, each space receiving the cool discharge air through an associated space distribution unit which includes heating apparatus supplied from a common heat source for reheating the cool air to provide temperature regulation within the space in response to a space temperature error signal from an associated space temperature control, is controlled by electronic processing means in combination with dedicated sensing and control apparatus which provide actuation of the air handler and common heat source only in response to actual sensed space temperatures outside of a temperature band established by heat and cool temperature reference signals stored in the electronic processing means, the electronic processing means further providing modulation of the cool discharge air temperature from the air handler, following actuation in response to an actual sensed space temperature higher than the cool temperature reference, in dependence on the temperature difference between the actual space temperature and the cool reference.

3 Claims, 11 Drawing Figures

ENERGY CONSERVATIVE CONTROL OF TERMINAL REHEAT HEATING, VENTILATING, AND AIR CONDITIONING (HVAC) SYSTEMS

This is a continuation of application Ser. No. 836,118 filed on Sept. 23, 1977 and now abandoned.

CROSS REFERENCE TO RELATED APPLICATIONS

Portions of the subject matter hereof are also disclosed, and some of it is claimed, in a commonly owned copending application entitled ENERGY CONSERVATIVE CONTROL OF HEATING, VENTILATING, AND AIR CONDITIONING (HVAC) SYSTEMS, Ser. No. 829,379 filed on Aug. 31, 1977 by John E. Games et al and now U.S. Pat. No. 4,205,381.

BACKGROUND OF THE INVENTION

1. Field of Invention

This invention relates to control apparatus for heating, ventilating, and air conditioning (HVAC) systems, and more particularly to control of terminal reheat type HVAC systems to reduce actual energy consumption required for maintaining desired environmental temperature conditions.

2. Description of the Prior Art

As described in the hereinbefore reference copending application, HVAC systems are used for controlling the environmental temperature conditions in one, or a plurality of structurally enclosed living spaces, i.e. those spaces inhabited by humans. In a terminal reheat type of HVAC system, of a type known in the art, the system provides temperature regulation in one or more living spaces by providing conditioned air to each of the spaces which is controlled to a determined cool discharge temperature value in an air handler source. The source may typically include a cooling source to provide precooled air at a determined discharge temperature to each of the plurality of spaces. Each space includes a terminal heat source located within each of the respective spaces. A system of this type is shown and described in U.S. Pat. No. 3,951,205 issued on Apr. 20, 1976 to A. H. Zilbermann, where a central utility means including a cold air source (generally referred to as an air handler source) presents cold discharge air through a main supply duct to each of a plurality of living spaces. The cold discharge air is received through a distribution unit in each space, and includes inlet and outlet dampers, a blower or supply fan, and a heating element. The cold discharge air is presented through the distribution unit into the space, and the temperature within the space is sensed by the thermostat. The heating element is positioned in the outlet duct of the distribution unit and is responsive, together with the supply fan and damper assemblies, to a pneumatic control signal presented from a thermostat within the space.

The inlet damper position is modulated in response to the pneumatic signal from the thermostat, i.e. too high a temperature drives the damper towards the full open position. For decreasing temperatures within the space the inlet damper is driven towards the full closed position, and if the temperature continues to decrease the heating element is actuated to provide a reheat of the cool air driven through the distribution unit. The pneumatic control loops for the space distribution unit are proportional gain loops. As described in the hereinbefore reference copending application, and as may be known to those skilled in the art, a proportional gain loop requires a constant output error term, i.e. a constant space temperature error to maintain a pneumatic signal of sufficient magnitude to drive the space dampers and reheat coils. The required space temperature error is referred to as a "droop error" and the magnitude of the "droop error" is dependent on the magnitude of the proportional gain selected, i.e. lower values of proportional gain result in a large "droop error" value, and higher values of proportional gain result in excessive limit cycle amplitudes due to the inherent time lags and thermal response of the system. These inherent time lags in system response result in a race condition, or "fighting", of the cold air source and the individual space reheat coil. To illustrate, a condition where the spaces are too cold results first in a closing of the inlet dampers, which in turn reduces the cold source load and causes a decrease in the cold air discharge temperature from the cold source. The cold source control loop requests a higher discharge temperature while at the same time, the individual space reheat sources are energized to increase the space temperatures. The overshoot of the space temperature then results in a decrease or shutoff of the reheat coils concurrent with an opening of the inlet dampers. The opened dampers increases the cold source load, increasing the cold source discharge temperature and requiring the cold source loop to increase the flow of the cold source medium, i.e. chill water, resulting in increased chill water consumption. This limit cycling of the cold source discharge temperature, i.e. typical peak-to-peak limit cycle amplitudes in cold deck temperature of 20° are common, consumes excessive amounts of energy in addition to the obvious waste in control energy in cycling the heating or cooling sources through these temperature extremes.

SUMMARY OF THE INVENTION

An object of the present invention is to control the operation of a terminal reheat HVAC system to reduce the actual energy consumption of the HVAC in providing temperature regulation in the controlled spaces.

According to the present invention, in a terminal reheat HVAC system which regulates the temperature in a plurality of temperature controlled spaces by modulating the temperature of cool discharge air presented to each space from the cooling apparatus of an air handler source in dependence on a selected discharge temperature reference, each space receiving the cool discharge air through an associated space distribution unit, each distribution unit including space heating apparatus supplied from a common heat source and responsive to a space temperature error signal from an associated space temperature control for reheating the cool discharge air to provide temperature regulation within the space, sensing apparatus is installed in the HVAC system for providing sense signals including an actual cool discharge air temperature signal and actual space temperature signals, and an electronic processor, connected to the HVAC and responsive to the sense signals from the sensing apparatus, compares the actual space temperature signals to heat and cool set point temperature signals which are stored in the processor and which define the limits of a temperature drift band, the processor providing actuation of the HVAC common heat source and of the air handler cooling apparatus only in response to actual space temperatures below and above, respectively, the heat and cool set point temperatures.

In further accord with the present invention the electronic processing means further provides modulation of the temperature of the cool discharge air from the air handler source, when actuated, in dependence on the magnitude of a space temperature error signal representative of the temperature difference between the cool set point temperature and the hottest actual space temperature above the cool set point.

In still further accord with the present invention the electronic processor provides a cool discharge air reference temperature signal at a magnitude equal to the sum of the product terms of the space temperature error signal multiplied by a proportional gain signal and an integral gain signal each stored in the processor, the processor comparing the cool air reference temperature signal with the actual cool discharge air temperature signal to provide a discharge error signal representative of the temperature difference therebetween, the processing means presenting the discharge error signal to the air handler source for controlling the modulation of the cool discharge air temperature in dependence on the magnitude thereof. In still further accord with the present invention, the processing means is responsive to, and stores, signals provided on an operator controlled keyboard which are representative of the space heat set point temperature reference, the space cool set point temperature reference, the proportional gain signal and the integral gain signal.

The foregoing and various other objects, features and advantages of the present invention will become more apparent in the light of the following detailed description of exemplary embodiments thereof, as illustrated in the accompanying drawing.

DESCRIPTION OF THE PREFERRED EMBODIMENT

Figure 4:
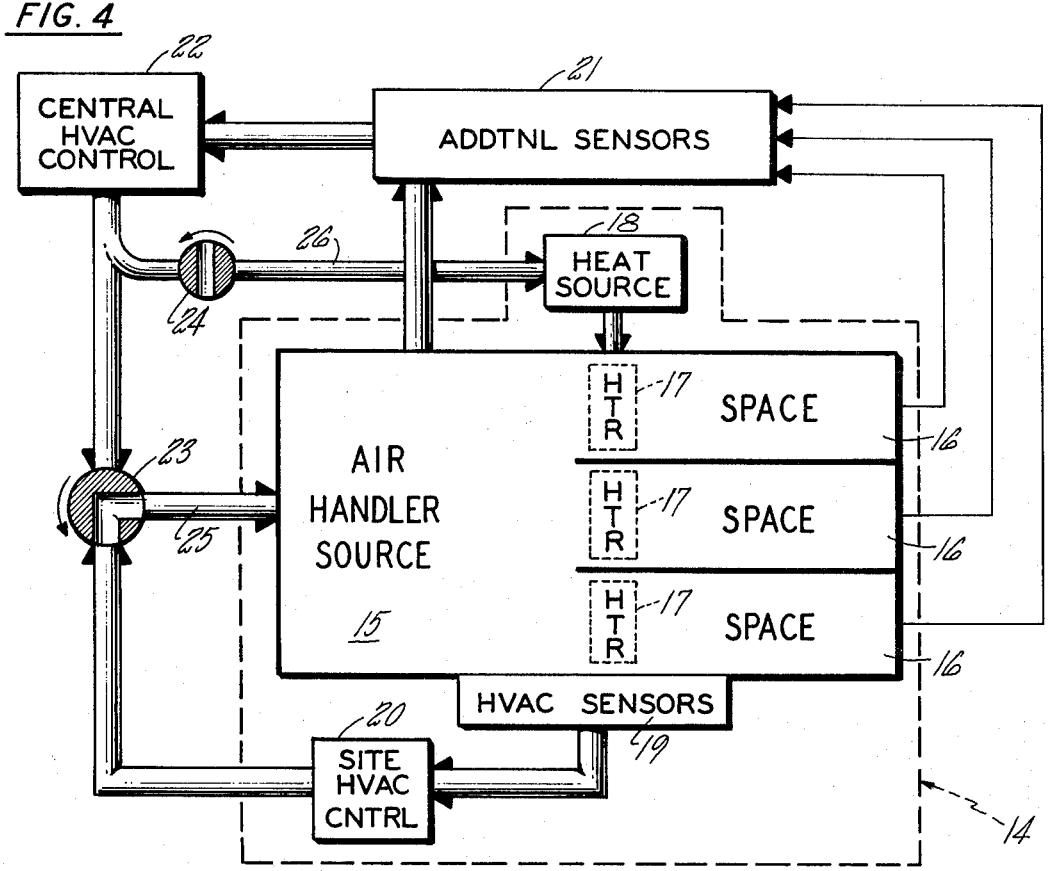
FIG. 4 is a simplified block diagram of the control system of the present invention.

The HVAC system control of the present invention may either be added directly to an existing, installed terminal reheat HVAC system, or as an addition to a new system, and provides centralized, direct digital control over the total HVAC system operation through interface apparatus selectably activated by maintenance personnel. The interface apparatus includes both control and sensor apparatus, and when deactivated restores total system operation to the existing HVAC control loops. Referring first to FIG. 4, in a schematic block diagram illustrative of the interface of the system control of the present invention with a terminal reheat HVAC system, the HVAC system 14 includes an air handler source 15 which supplies cool discharge air to one or more temperature controlled living spaces 16, each having heating apparatus 17 located within the cool airflow path to the respective space and supplied with hot fluid flow from a common heat source 18. The operation of the air handler 15, and the actual temperature conditions in the spaces 16 are monitored by a plurality of HVAC sensors 19 which provide sensed parameter information such as cool discharge air temperatures, space temperatures, and outside air temperature and enthalpy conditions, to a site HVAC control 20, which responds by providing control signals to the air handler to control the cool discharge air temperature through position control of respective valves and mixed air dampers within the air handler. In accordance with the present invention, additional sensors 21 are installed to provide both redundant sensing of selected parameters in addition to new sensed parameters, and to provide the sensed information to a central HVAC control 22. Interface apparatus 23, 24, selectably operable in either of two operating states, are installed into the existing air handler control lines 25 and into an added control line 26 to the heat source 18.

As described in detail hereinafter, when selected, the central HVAC control 22 provides direct digital control over the air handler 22 and heat source 18. In a preferred embodiment the central control includes a digital, central processing unit (CPU) which may be located at some distance from the facility or building in which the HVAC system is installed, in combination with a remote microprocessor (RMP) installed at the building site in close proximity to the HVAC. The RMP provides signal conditioning and storage of the sensed parameter signals from the sensors 21 in addition to providing data compacting and front end processing of the sensed signals prior to presentation to the CPU. The RMP transmits the sensed data to the CPU on request. The CPU compares the sensed signal information with stored values, and computes command reference signals, including cool discharge air reference temperatures using proportional and integral gain constants whose values may be reprogrammed to accommodate changes in HVAC operating conditions. The reference signals are transmitted back to the RMP which compares each reference value with the corresponding actual sensed value of the parameter to provide innerloop, proportional gain control over the associated control device within the HVAC system, i.e., the system valve for the air handler cold source, or the mixed air damper actuators. The result of the combination of CPU and RMP control is an innerloop proportional control over the air handler performance provided by the RMP, and an outer loop proportional plus integral control provided by the CPU.

Figure 1:
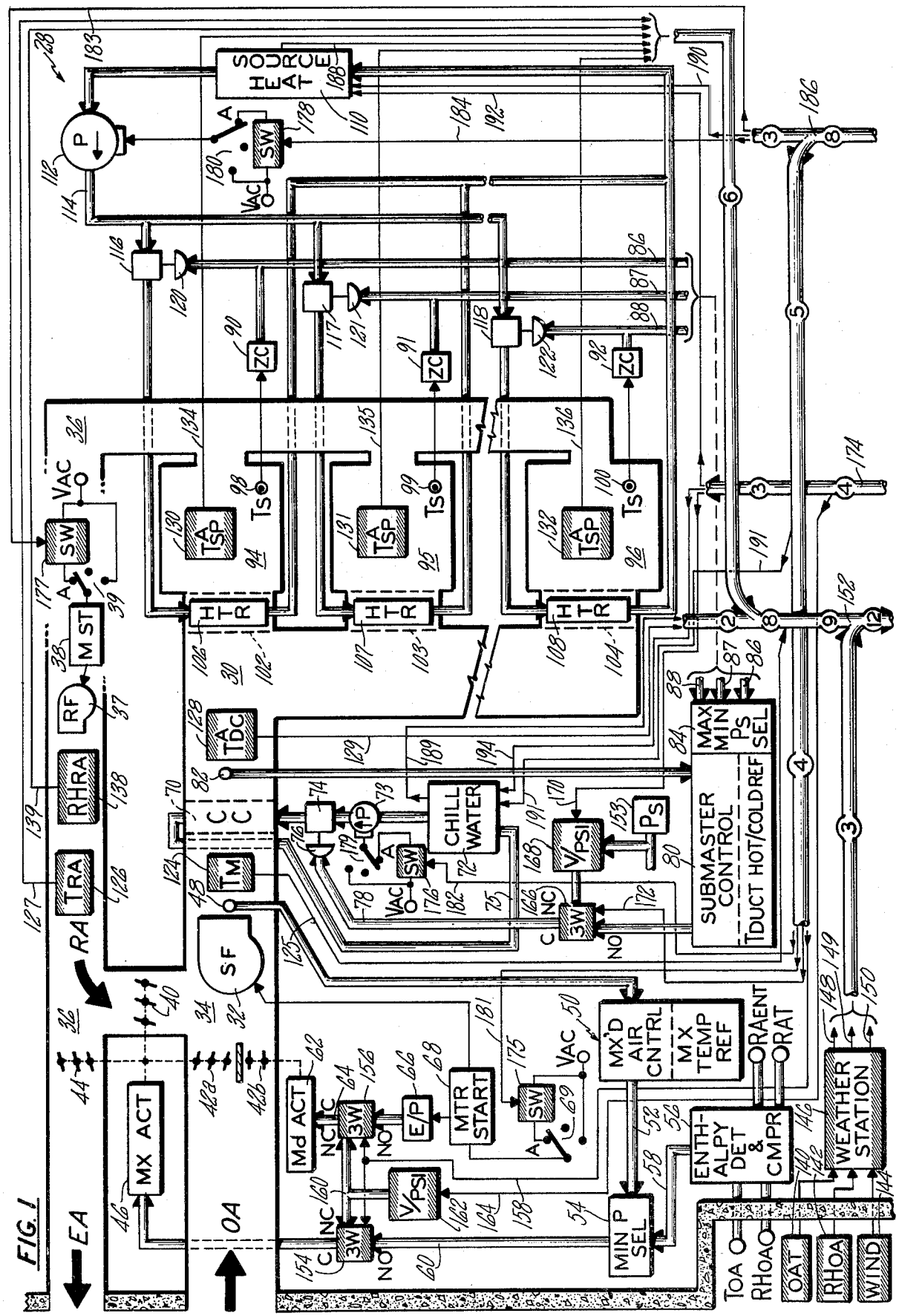
FIG. 1 is a schematic block diagram of a terminal reheat HVAC system having interface apparatus installed for both control and sensing of HVAC performance in accordance with the present invention.

Referring now to FIG. 1, in a typical prior art terminal reheat type of HVAC system 28, an air handler includes a cold deck 30 provided with airflow from a system supply fan (SF) 32 which forces mixed air from a chamber 34 through the deck. The chamber 34 receives conditioned return air (RA) from the temperature controlled spaces through a return air deck 36. In some systems the RA is forced through the return deck by a fan 37 under the control of a motor start circuit 38 and manually operated switch 39, and is presented to the chamber 34 through a RA damper 40. The chamber 34 also receives outside air (OA) presented through OA dampers $42_a$, $42_b$. The dampers are position controlled by a pneumatic mixed air damper actuator 46 which typically may comprise three separate actuators, one for each damper set, which are pneumatically synchronized such that the position of the dampers $42_a$ and 40 are inversely proportional, whereas the position of the dampers $42_a$ and 44 are directly proportioned. The dampers $42_b$ are minimum OA dampers which provide, when opened, a determined minimum percentage of OA to the HVAC living spaces. In the prior art system, the dampers $42_b$ are not position modulated, but are either opened fully, or to some manually adjustable percentage of full open, whenever the supply fan 32 is on, and full close when the fan is off, without consideration to the occupancy status of the living spaces.

The actuator 46 provides position control of the dampers $42_a$, 40 to allow the air within the chamber 34 to include 100% OA, a combination of RA and some minimum OA or any proportional ratio therebetween. The mixture of air within the chamber 34 is determined by a proportional gain closed loop control which includes a sensor 48 which measures the discharge air temperature from the chamber 34 and presents a signal representative of the temperature value to a mixed air controller 50 which compares the sensed temperature with a mixed air temperature reference and generates a pneumatic signal proportional to the difference therebetween. The pneumatic signal is presented through a pneumatic line 52 to a minimum pressure selector 54 which compares the signal on the line 52 with the signal provided through an OA enthalpy detector 56. The detector provides an inhibit to the mixed air control loop by providing a minimum pressure pneumatic signal on the line 58 in response to an OA enthalpy greater than the inside enthalpy, which makes the use of OA undesirable. The selector 54 presents the minimum pressure signal from the line 58 through a line 60 to the actuator 46, which responds by closing dampers $42_a$ and opening the damper 40. In the absence of an inhibit signal on the line 58, the pneumatic signal from the mixed air control 50 on the line 52 is presented through the selector 54 and line 60 to the actuator 46, which responds to the signal magnitude to provide a proportional positioning of the dampers $42_a$, 40, and 44 to attempt to achieve the desired mixed air temperature within the limitation of the droop error band.

The position of the minimum OA dampers $42_b$ is controlled by an actuator 62 in response to a discrete pneumatic signal on the line 64 which either causes the actuator to position the dampers in the open, or full closed position. In the prior art HVAC system the signal on the line 64 is provided directly from an electro-pneumatic (EP) transducer 66 which is responsive to an electrical signal from a motor start circuit 68 under the control of a manual switch assembly 69, and which indicates the energizing or deenergizing of the supply fan 32. The dampers $42_b$ are closed whenever the supply fan 32 is deenergized.

The cold deck 30 includes cooling apparatus, such as a cooling coil 70 presented with a cold fluid flow such as chill water presented through a closed flow loop including a source 72, pump 73, a system flow control device, such as a valve assembly 74, and a return line 75. The valve 74 is controlled by a pneumatic actuator 76 which in turn responds to pneumatic control signals presented through a line 78 from a submaster control 80. The submaster control 80 provides position control of the valve 74 from a full closed to a full open position to attempt set control of the cool discharge air temperature monitored by a temperature sensor 82. In the operation of the prior art, terminal reheat HVAC system, the control 80 provides a cold deck reference temperature by summing a fixed set point temperature reference (adjustable within the controller by an operator at the HVAC site) with the product of a space temperature error and a determined proportional gain constant. Typically the control 80 responds to the hottest sensed space temperature presented through a max/min pressure selector 84 which receives all of the sensed space temperatures on pneumatic lines 86–88 from individual space controllers, or thermostats 90–92. The thermostats 90–92 compare the sensed actual temperatures in the spaces 94–96, which are provided by sensors 98–100, with the desired temperature set into the thermostat by the human occupant.

The spaces 94–96 receive the cool discharge air from the cold deck 30 through respective distribution units 102–104, each including associated heating apparatus 106–108. The distribution units may be similar to that disclosed by Zilbermann in the hereinbefore referenced U.S. patent, however, for sake of simplicity and clarity of illustration the distribution unit inlet and outlet damper assemblies of Zilbermann are not shown. Rather, the distribution units 102–104 represent a generic illustration of those types of units used in terminal reheat HVAC systems, i.e., apparatus for directing the cool discharge air from the cold deck 30 through some type of heating element and into the corresponding space. The heaters 106–108 are of a type known in the art, such as heating coils supplied with a hot fluid flow such as hot water. In the system of FIG. 1, the heating coils 106–108 are supplied with hot water generated in a heat source 110, which provides the hot water through a primary pump 112 and common supply line 114 to each of a plurality of space flow control devices, such as valve assemblies 116 through 118. The valves 116–118 are controlled by associated pneumatic actuators 120–122 which are responsive to temperature error signals provided on the lines 86–88 from corresponding thermostats 90–92.

As described hereinbefore with respect to the Zilbermann patent, in the operation of the prior art HVAC system of FIG. 1 the selection of a desired space temperature results in a space temperature error presented through lines 86–88 to the submaster control 80, and to the associated pneumatic actuators 120–122. Space temperature error signals indicative of a hot temperature error, i.e., the actual sense temperature is greater than the selected space set point temperature, results in the submaster control 80 providing a pneumatic signal to the actuator 76 causing a further opening of the valve 74, increasing the flow of chill water from the source 72 to the cooling coil 70, and decreasing the cool discharge air temperature to attempt to satisfy the hot space temperature error in the given space. If the space temperature error is indicative of a cold error signal, i.e., the actual space temperature signal is below the selected set point temperature, the associated one of the pneumatic actuators 120–122 responds by opening the respective one of the valve assemblies 116–118 providing increased hot water flow through the valve to the associated heating coil. As a result, the cold deck discharge air into the space providing the cold error signal is heated to a temperature high enough to attempt to satisfy the given space and reduce the cold error signal to zero. The heater control loop suffers from the same "droop error" characteristics as that of the cold deck discharge loop, due to the strictly proportional gain control of each.

So far the description has been that of a terminal reheat HVAC system of a type known in the art. In the control system of the present invention the existing HVAC system is interfaced with the sensors and central control (21, 22 of FIG. 4) at selected control and sense parameter location. In FIG. 1 the added interface components are shown shaded for clarity of illustration and include, but are not limited to, the components listed hereinafter. Temperature sensors of a type known in the art, such as resistance temperature sensors comprised of ultra precision nickel wire for measuring the temperature in the cold deck, and the indoor/outdoor freestanding air, over a typical temperature range of from $-40°-+250°$ F., with a temperature coefficient of $+3$ OHMS/°F., including a mixed air sensor ($T_M$) 124 connected to a line 125, a return air sensor ($T_{RA}$) 126 connected to a line 127, a cold deck discharge temperature sensor ($T^A DC$) 128 connected to a line 129, and space temperature sensors ($T^A{}_{SP}$) 130–132 connected to lines 134–136. The temperature sensors are located within the HVAC system generally as illustrated in FIG. 1. Further sensors include a return air, relative humidity sensor ($RH_{RA}$) 138 connected to a line 139, and an outside air (OA) temperature sensor 140, an OA relative humidity sensor ($RH_{OA}$) 142, and an OA average wind sensor ($W_S$) 144, each mounted outside the building structure, and each presenting sensed information to a weather station 146 of a type known in the art, such as the Texas Electronic Series 3000 Modular Meterological system, which provides the OA sensed signals on lines 148–150. The signal lines 125, 127, 129, 134–136, 139 and 148–150 are presented through a conduit, or trunk line 152 to an input of the remote microprocessor (RMP), described hereinafter.

The control interface between the central control and the existing HVAC system is made by installing electropneumatic (EP) transducers in combination with three-way valves in the pneumatic control lines of the various HVAC system actuators and valves. The three-way valves are of the type well known in the art such as the Johnson Controls Model V24, and are selectably operable in one of two positions from a common (C) port to either a normally closed (NC), or a normally open (NO) port. Each three-way valve is installed in the corresponding pneumatic control line in such a manner as to provide connection of the existing pneumatic line between the C and NO ports, and the NC port is connected to the pneumatic output line of the EP transducer. The instantaneous position of the three-way valve is determined by the energizing of a solenoid within the valve assembly with a typical energizing voltage of 24 volts AC which is presented to the solenoid in response to the presence of a discrete energizing signal from the RMP. In the presence of a discrete energizing signal at the input of the three-way valve, a pneumatic pressure signal path is provided between the normally closed and common ports, i.e., the output of the EP transducer and the input to the controlled device. This allows for a "fail safe" operation in that a failure in the RMP provides restoration of the three-way valve pneumatic signal path to the common and normally open ports restoring control to the existing HVAC system. The EP transducers are similarly of a type known in the art, such as the Hammeldahl Model T15. The transducers are charged from the existing system pressure source ($P_S$) 153 to provide an operating pneumatic pressure signal over a typical range of 0–20 psi in response to an analog voltage signal from the RMP within a determined input analog voltage range.

The control of the HVAC mixed air is provided by installing three-way valves 154, 156 in the pneumatic control lines 60, 64 of the mixed air actuator 46 and min damper actuator 62 respectively. The C and NO ports are connected to the existing pneumatic lines as shown, and the discrete switching signal is presented to each valve on a line 158 from the RMP. The NC port of each valve is connected through a pneumatic line 160 to the pneumatic output of a common EP transducer 162 which receives an analog electrical signal input on the line 164 from the RMP. The two actuators are driven with the common pneumatic signal from the transducer 162. The operation, and control of the HVAC mixed air source is shown and described in the hereinbefore, cross-referenced copending application.

Control of the cooling coil 70 is provided by installation of a three-way valve 166 in the pneumatic control line 78 to the system chill water valve actuator 76. The three-way valve 166 is similarly installed with the C and NO ports of the valve connected to the existing pneumatic line, the NO port being connected to the pneumatic output of a EP transducer 168 which receives an analog voltage signal input from the RMP on the line 170. The three-way valve 166 is selectively operable in dependence on a discrete voltage signal presented through a line 172 from the RMP. The analog signal input to the EP transducers 162, 168 on the lines 164, 170 are presented from the RMP on a common trunk line 174.

System control over the operating state of the supply fan 32, the return air fan 37, the cold source pump 73, and the heat source pump 112, is provided through selectively operable voltage control switches 175–178 of the type known in the art, which provide a double throw equivalent function and when energized provide electrical connection between the voltage source $V_{AC}$ and a selectable automatic (A) contact position of the manual switches 39, 69, and 113 for the fans 32, 37, and manual switches 179, 180 for the pumps 73, 112. The voltage controlled switches 175–178 are controlled through discrete gate signals provided on the lines 181–184. All of the discrete signals from the RMP to the three-way valves and gate controlled switches, on the lines 158, 172, and 181–184 are presented from the RMP common trunk line 186.

In addition to the sensor and interface control apparatus described hereinbefore, central system control over the hot and cold fluid discharge temperature from the heat source 110 and cold source 72 may also be achieved through an interface with the RMP. The required interface apparatus is dependent on the particular type of cold and heat source included in the system, i.e., the heat source 110 may heat the hot water discharge through the use of steam heat, or alternatively through the use of electrical or fossil fuel fired heaters, similarly the cold source may comprise a chiller of two basic types, a steam absorption of a type well known in the art, or an electrical centrifugal chiller (known also as a reciprocating chiller) with the control and sense apparatus differing with each. FIG. 1 illustrates the generic interface connection between the RMP and the sources 110, 72 as including sensed parameter information from each source to the RMP on lines 188, 189, discrete signal input lines to each source from the RMP on lines 190, 191, and analog input signals to each source from the RMP on the lines 192, 194. The sensed lines 188, 189 are presented to the RMP through the common trunk line 152, the discrete signal input from the RMP to each source on the lines 190, 191 are presented from the RMP on the common trunk line 186, and the analog signal input to the sources on the lines 192, 194 are presented from the RMP on the common trunk line 174. With the hereinbefore described interface control lines from the RPM to each of the sources 72, 110 the RMP is capable of controlling the fluid discharge temperature from any type of known heat or cold source device through the addition of known interface equipment such as the three-way valves, and EP transducers described hereinbefore, the three lines to each source providing the basic information required, i.e., sensed parameter information from the output of the source, a discrete signal input to provide switching as may be required, and an analog voltage signal input to provide the set point control.

The interface apparatus shown in FIG. 1 is not necessarily inclusive, such that additional interface and sensing apparatus may be provided as deemed necessary, or convenient to provide control of the terminal reheat HVAC system according to the present invention.

As stated hereinbefore, the HVAC control system of the present invention provides both inner loop control, i.e., the actual positioning of the cooling coil valve positions when on cool control, and the positioning of the mixed air dampers when on mixed air control, through the RMP which compares the sensed system temperatures with reference temperature values provided through outer loop computations performed in the CPU. The RMP provides signal conditioning and analog-to-digital transformation of the analog sense signals, storage of the sensed signal values in a random access memory (RAM) of the RMP between update intervals, and reads out a selected one or all of the stored parameter values to the CPU upon request. All of the functions performed by the RMP may be provided in the CPU itself, however, the use of a small RMP to provide front end data processing and interim storage, in addition to providing direct control of the various dampers and valve positions, is preferred since it allows a freeing up of the CPU, which reduces the actual computer time and allows the CPU to perform other tasks. Although the use of an RMP in combination with the CPU is preferred, its use is dependent upon the particular implementation of the present invention and may be found to be unnecessary.

Figure 2:
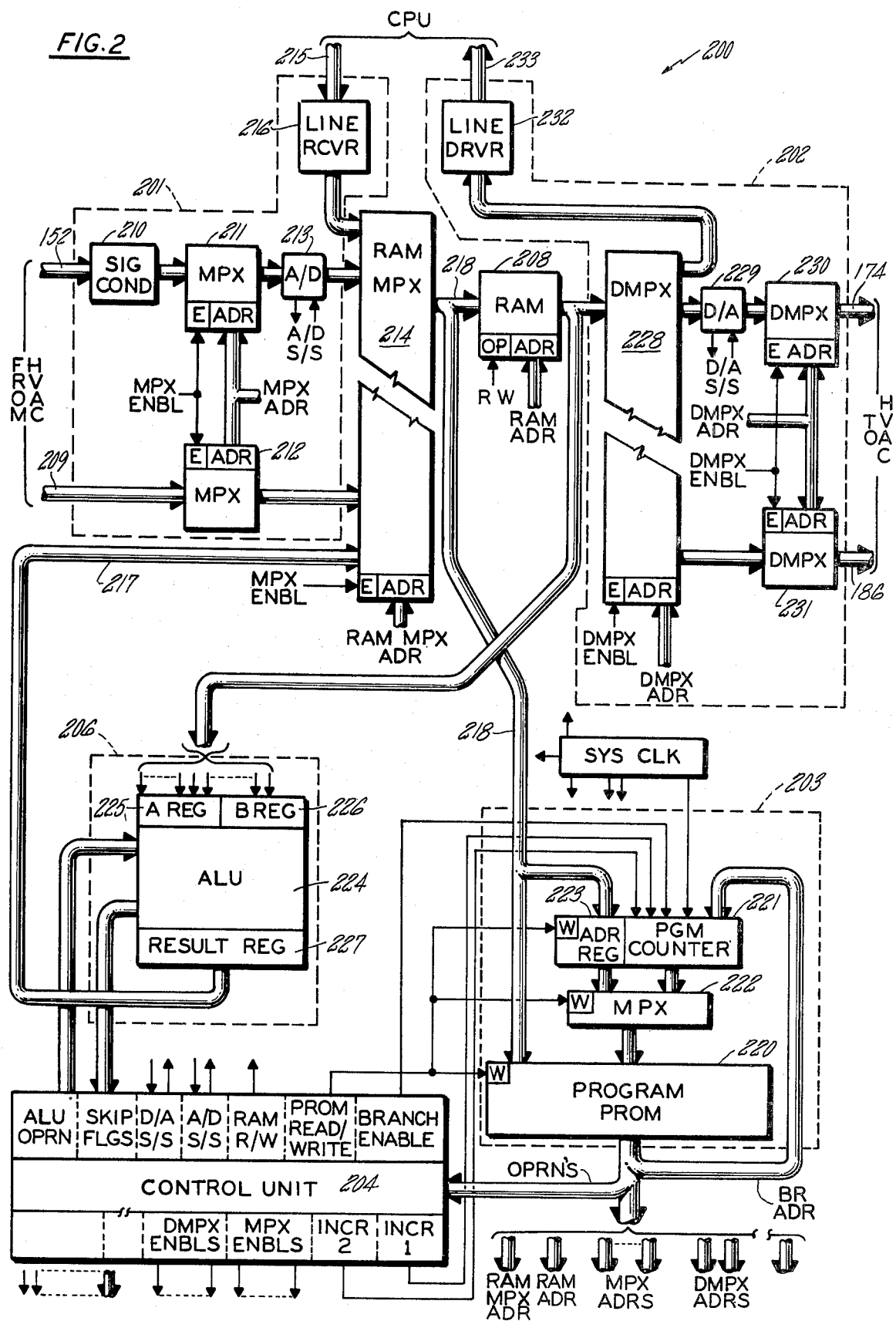
FIG. 2 is a simplified, schematic block diagram of a microprocessing system as may be used with the present invention.

Referring now to FIG. 2, an RMP 200 which may be used to implement the control system of the present invention is illustrated as having the architecture of a typical digital microprocessor system. The RMP is a combination of basic microprocessor elements including: input, output sections 201, 202 for receiving and transmitting data to the HVAC system and CPU; a main memory section 203 for providing programmed instructions for the RMP through opened address programming; a control unit 204 for providing program control over RMP operation sequencing; an arithmetic unit 206 for providing the operational add, subtract, multiply, and divide functions of the RMP, and a random access memory (RAM) 208 for providing memory storage of the interim and final result outputs from the arithmetic unit 206 and for all signal information from the input section 201, including sensed HVAC data and CPU instruction commands.

The input section 201 receives the analog sensed signals from the HVAC on the trunk line 152 in addition to any discrete signals from the HVAC, such as temperature alarm units and pneumatic line ΔP limits, on a line 209. The analog signals on the line 152 are presented through signal conditioners 210 to the input of a multiplexer (MPX) 211, and the discrete signals on lines 209 are presented to the input of an MPX 212, both MPX's being under program control from the programmable memory 203. The output of the MPX 211 is presented to an analog-to-digital (A/D) converter 213 which exchanges start/stop commands with the control unit 204. The output of the A/D 213 and MPX 212 are presented to inputs of a RAM MPX 214 which also receives CPU signal information presented from the line 215 through a line receiver 216, in addition to the output from the arithmetic unit 206 on lines 217. The MPX 214 scans each of the input lines under a RAM MPX program address from memory 203 on command of MPX strobes generated by the control unit 204, and presents the information at each input through lines 218 to the RAM 208, which stores it in a memory location defined by the RAM address programming from the main memory. In addition, the output from the MPX 214 on the lines 218 is presented to the input of the main memory 203 to provide, under command of a program subroutine, access by the CPU to the main memory 203 for reprogramming the RMP operational instructions stored in the main memory.

The main memory section 203 includes a programmable read only memory (PROM) 220 normally responsive to the output of a program counter 221 presented through an MPX 222. The PROM 220 may actually comprise a read/write memory so as to be alternatively responsive to CPU interrupt or reprogramming instructions presented on the lines 218 to another input of the PROM 220 and to an address register 223, connected through the MPX 222. The PROM 220 provides operand address programming for the RAM MPX 214, the RAM 208 address, and the program address for the multiplexers and demultiplexers (MPX, DMPX) of the input and output sections 201, 202. In addition the PROM 220 provides the operand addressing to the control unit 204 and the branch address to the program counter 221.

The arithmetic unit 206 includes an arithmetic logic unit (ALU) 224 which performs the selected mathematical function on the data presented from the RAM 208 through the operating A and B registers 225, 226. The result of the ALU operation is presented through a result register 227 to the input of the RAM MPX 214. The ALU operation (arithmetic, i.e., add, subtract, multiply, divide, logic, or compare, etc.) is selected by the control unit 204, and the RAM operand address, which controls the data presented to the ALU from the RAM, is provided from the PROM. As may be required, SKIP FLAGS are generated by the ALU and presented to the control unit to provide PROM skip instructions as may be necessary during the particular mathematical operation being performed. The result data stored in the RAM 208 is presented to the CPU and to the HVAC system (on CPU request or PROM 220 program command) through a demultiplexer (DMPX) 228 which, under program control from the PROM 220 presents the analog command signals to the HVAC, i.e., the input signals to the EP transducers, etc. of FIG. 1, through a digital-to-analog converter (D/A) 229 and DMPX 230 to the lines 164, 170, 192 and 194 within the trunk line 174 (FIG. 1), the HVAC discrete signals through a DMPX 231 to the lines 158, 172, 180, 182–184, 190, and 191 within the conduit 186) of FIG. 1, and the data output to the CPU through a line driver 232 and lines 233. Both DMPX's 230, 231 are under program control from the PROM 220 and the D/A 229 exchanges start/stop strobes with the control unit 204.

In operation, as known to those skilled in the art, the MPX 214 reads all of the input data to the RMP 200 into the RAM 208 where it is stored at address locations determined by a RAM address program from PROM 220. The PROM scans and identifies all data entries to the RAM, both sensed HVAC parameter information and inputs from the CPU, by ordering both stored data and stored control character code information from the RAM 208 into the A and B registers 225, 226 of the arithmetic unit 206. A PROM program subroutine then sequentially compares identifying characters contained within selected bytes of the information word with each of a plurality of identifying characters within the character code until the information word is identified. Depending upon the identification of the information word, the program may branch to various addresses as determined from the PROM 220 and the word may be returned to the same location in RAM or changed to a different address location. This may be accomplished through SKIP FLAGS dependent on results in the ALU 224 and presented to the control unit 204. A SKIP FLAG causes the program counter to increment two steps, such as to bypass a branch instruction; no SKIP FLAG causes an increment of one, allowing execution of the next sequential instruction (operational or branch). Use of various branch instructions enables the program to unconditonally branch to an address stored in PROM 220, to call up various subroutines as required for the program operation during normal running of the RMP.

The RMP includes a subroutine for identifying CPU program change instructions, wherein a first word from the CPU is presented through the MPX 214 into a RAM 208 memory location determined by the address program. The word is identified by the normal PROM scanning of the stored RAM data through the subroutine described hereinbefore. When identified as a CPU instruction, a PROM write strobe from the control unit 204 is presented to the address register 223 allowing entry into the register of the next word from the CPU appearing on the line 218 and containing the desired address location in PROM 220 of the new CPU instruction. A third word from the CPU, containing the instruction change information, is presented from the lines 218 to the input of the PROM 220 simultaneously with the presentation of a second PROM write strobe from the control unit 204 to the MPX 222 which allows the PROM 220 to read the address location stored in the register 223 together with the instruction word appearing at the input on the line 218. In this manner operating program instructions stored in the PROM 220 may be altered by CPU command. Similarly the values of operating constants for the inner loop control of the HVAC system, which are stored in the RAM 208, may similarly be changed on CPU instruction which orders the PROM 220 to pull out the appropriate constant stored in the RAM 208 and read in the new value of the constant from the CPU.

The RMP 200 is free running, i.e., asynchronous with the CPU, and scans the sensed analog and discrete input signals from the input section 201 at a rate typically ten times greater than that required by the CPU, i.e., typically the CPU receives data from the RMP every 10 seconds, and the RMP scans all of the data input lines and closes each of the proportional gain inner control loops every one second. The normal free running scan of the sensed parameters is interrupted for communication with the CPU, for both program change commands and commands for data read out from the RAM 208. The interrupt time represents approximately 5% of the total RMP running time. The CPU also interrupts the RMP to provide loading of CPU calculated temperature reference values into the RAM 208, to command the RMP 200 to provide comparison of the duct reference temperature with the stored sensed temperature values, and to generate the resultant error control signal to the appropriate valve or damper actuator within the HVAC system. The control procedures for the RMP 200 is stored in the PROM 220 while the RAM 208 stores both the sensed data and control character code subroutine information, in addition to providing scratch pad storage for the arithmetic unit 206. Similarly, specific data acquisition software, i.e., unique configuration tables for a specific control loop is loaded from the CPU and is stored in the RAM 208. Memory capacity for the RMP is typically 2K words of PROM and 4K words of RAM. In addition to providing the data acquisition from the HVAC system sensors and proportional inner loop control of the HVAC control devices, the RMP also provides a program shutdown routine stored in the PROM 220 for relinquishing control from the CPU to the existing HVAC site control loop. It should be understood that the RMP of FIG. 2 is illustrative of one configuration of a dedicated microprocessor system suitable for providing the data acquisition and front end processing of data for the CPU, and the specific architecture is dependent on a given particular implementation of the present invention and forms no part of this invention. Similarly, any suitable general purpose microprocessor known in the art and having the requisite characteristics, such as the industry standard model 8080A, may be used if desired with standard programming techniques.

Figure 3:
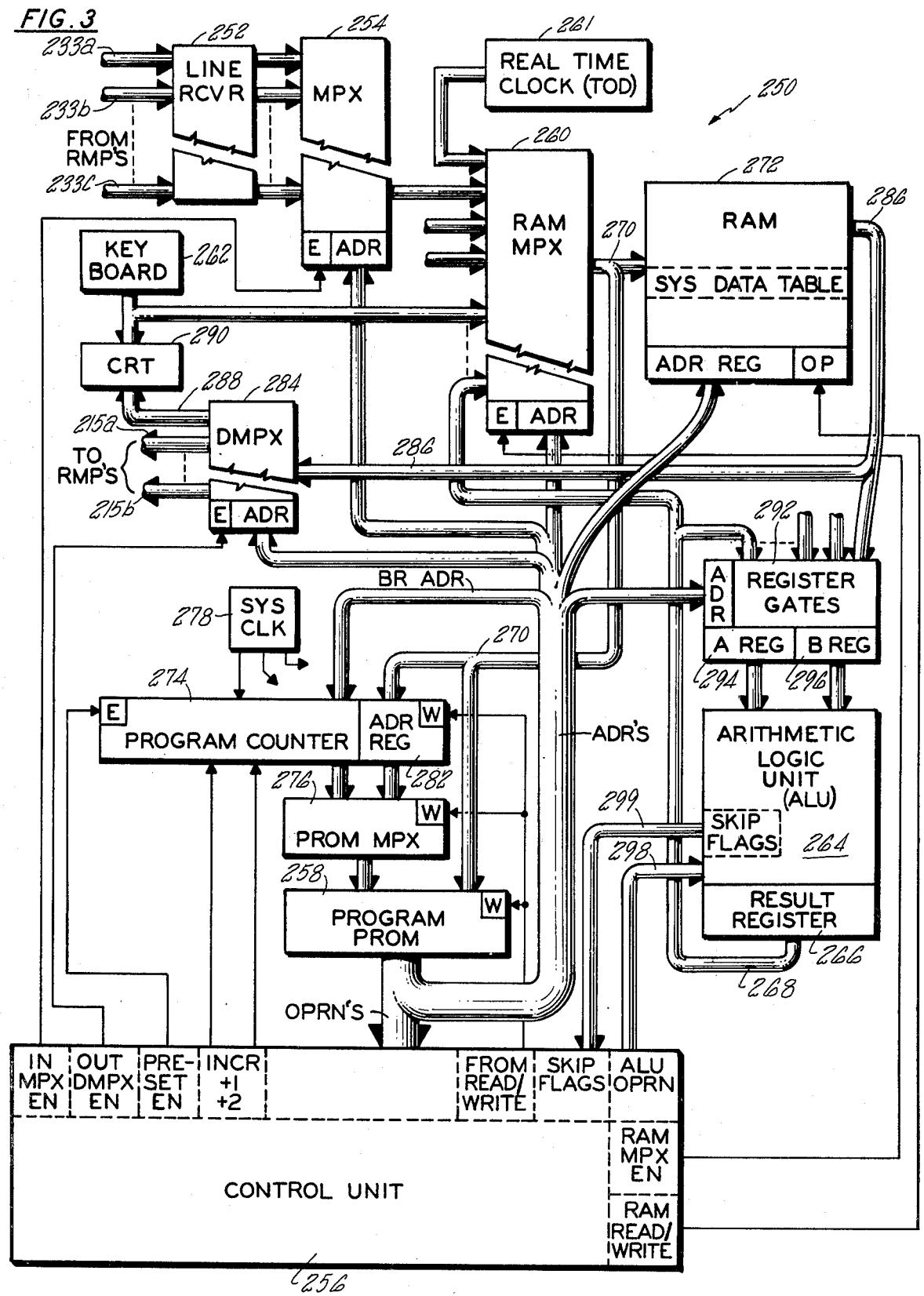
FIG. 3 is a simplified schematic block diagram of a real time digital processing system as may be used with the control system of the present invention.

Referring now to FIG. 3, a system which may incorporate the central control function of the present invention is illustrated as representing the architecture of a typical, real time data processing system 250. Input data lines $233_a$–$233_b$ from each of a plurality of RMPs, such as the RMP 200 of FIG. 2, are presented through line receivers 252 to a corresponding one of a plurality of inputs of an MPX 254 which, when enabled by a strobe from a control unit 256, sequentially scans the input lines under address program control of a programmable read only memory (PROM) 258. Each of the input data signals are presented in turn through lines 259 to one input of a RAM MPX 260 which scans a plurality of RAM input data lines including, the output from a real time clock 261 which provides the time of day (TOD) with a timekeeping capability ranging from seconds to years, the output of a keyboard 262 presented through lines 263, and the output of an arithmetic logic unit (ALU) 264 presented through a result register 266 and a set of lines 268. The RAM MPX 260 scans each of the input lines when enabled by a strobe from the control unit 256 under address control from the PROM 258, and presents the selected input data lines through a set of lines 270 to the input of a RAM 272 and to a write input of the PROM 258. The RAM 272 is similarly under an address program control from the PROM 258 and receives an operational code strobe (RAM READ/WRITE) from the control unit 256.

The control unit 256 responds to command inputs from the PROM 258 which in turn is under control of a program counter 274 presented through a PROM MPX 276. The program counter 274 receives the output of a system clock 278 which provides the CPU operating time base. The program counter 274 is also responsive to preset enable, and increment one, and increment two strobes from the control 256. The PROM MPX 276 is responsive to read/write control signals from the control unit 256 to present either the output of the program counter 274, or alternatively the output of an address register 282 to the input of the PROM 258. The address register 282 receives the output of the RAM MPX 260 on the lines 270 and is used in conjunction with a subroutine similar to that described hereinbefore with respect to the RMP 200 of FIG. 2, to provide reprodgramming of the PROM 258 through keyboard 262 entry by a maintenance operator.

In addition to providing the address programming for the MPX's 254, 260 and the RAM 272, the PROM 258 also provides operational address programming for a demultiplexer (DMPX) 284 which presents the output from the RAM 272 on lines 286 to a plurality of output lines including lines 288 to a video display (CRT) 290 which provides visual display of input information presented through the keyboard 262 by the operator and output data presented to the RMP from the CPU, and lines $215_a$–$215_b$ to the RMPs. The PROM 258 also provides the branch address to the program counter 274 and program address information to address register gates 292 which control the data flow into the A and B registers 294, 296 of the ALU 264.

The stored program within the PROM 258 is implemented through the control unit 256 which provides enabling strobes for the CPU multiplexers and demultiplexers in addition to providing operative read/write instructions to the RAM 272 and operation instructions (arithmetic, logic, compare, etc.) to the arithmetic unit 264 on lines 298. The control unit 256 receives instruction inputs to alter the PROM sequence from SKIP FLAGS generated in the ALU 264 and presented on the lines 299.

The real time data processing system of FIG. 3 represents one configuration of a dedicated hardware, real time data processing apparatus which may be advantageous for use in implementing the control system of the present invention where general purpose programming is neither required nor practical in view of the control functions to be performed. It should be understood, however, that the specific architecture is dependent on the particular implementation of the present invention, and forms no part of the present invention. If it is deemed necessary, or practical, any one of a number of well known processing systems may be used as may be obvious, or readily apparent, to those skilled in the art. As is more apparent in the light of detailed operational descriptions provided hereinafter, well known processing systems such as the Digital Equipment Corporation model PDP 1135 or 1140 general purpose computers used in combination with real time operating software such as the Digital Equipment Corporation RSX-11M real time software system, employing only programs provided through programming techniques well known in the art, may be utilized in conjunction with the remote microprocessor and the HVAC sensors and interface control equipment described hereinbefore.

Figure 5:
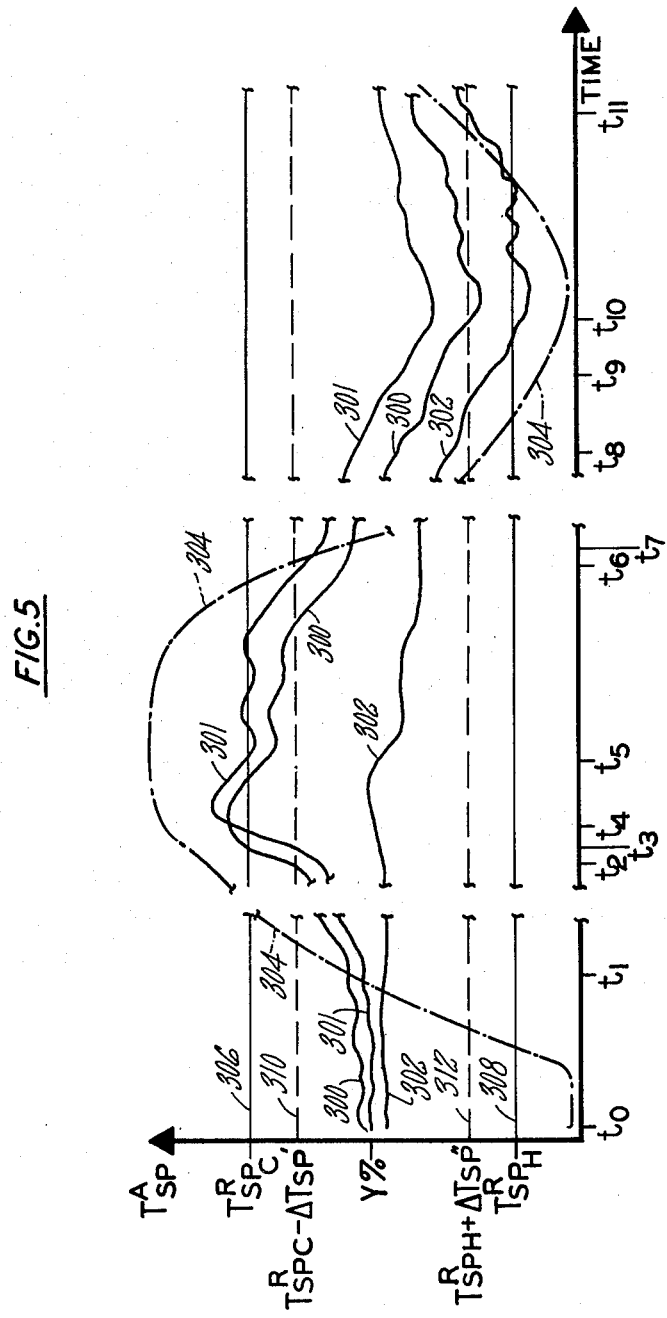
FIG. 5 is an illustration of operating waveforms used in the description of the control of the HVAC system of FIG. 1 in accordance with the present invention.

Referring now to FIG. 5, in the operation of the terminal reheat HVAC system control according to the present invention, a given set of sensed temperatures $(T_{sp}{}^A)$ 300–302 for the spaces 94–96 (FIG. 1) and a sensed OAT 304 are plotted against time (t). At time $t_0$ the temperatures 300–302 are all within a central temperature range of a space temperature drift band established by a space cool set point temperature reference $(T_{spC}{}^R)$ 306 and a space heat set point temperature reference $(T_{spH}{}^R)$ 308. The central temperature range of the drift band extends over a range of values from a cool threshold value $T_{spH}{}^R - \Delta T_{sp}'$, 310, to a heat threshold value $T_{spC}{}^R + \Delta T_{sp}''$, 312, where $\Delta T_{sp}'$ and $\Delta T_{sp}''$ are selectable, incremental temperature values which may be equal. For typical cool and heat set point temperature references of 78° F. and 68° F., the cool and heat threshold values are typically 76° F. and 70° F. The space cool and heat set point temperature references establish the temperature threshold limits above and below which controlled actuation of the mechanical cooling and heating sources is provided (energizing the cooling coil 70, or the heating source 110 of FIG. 1) in response to a sensed space temperature value outside the threshold band.

Figure 6:
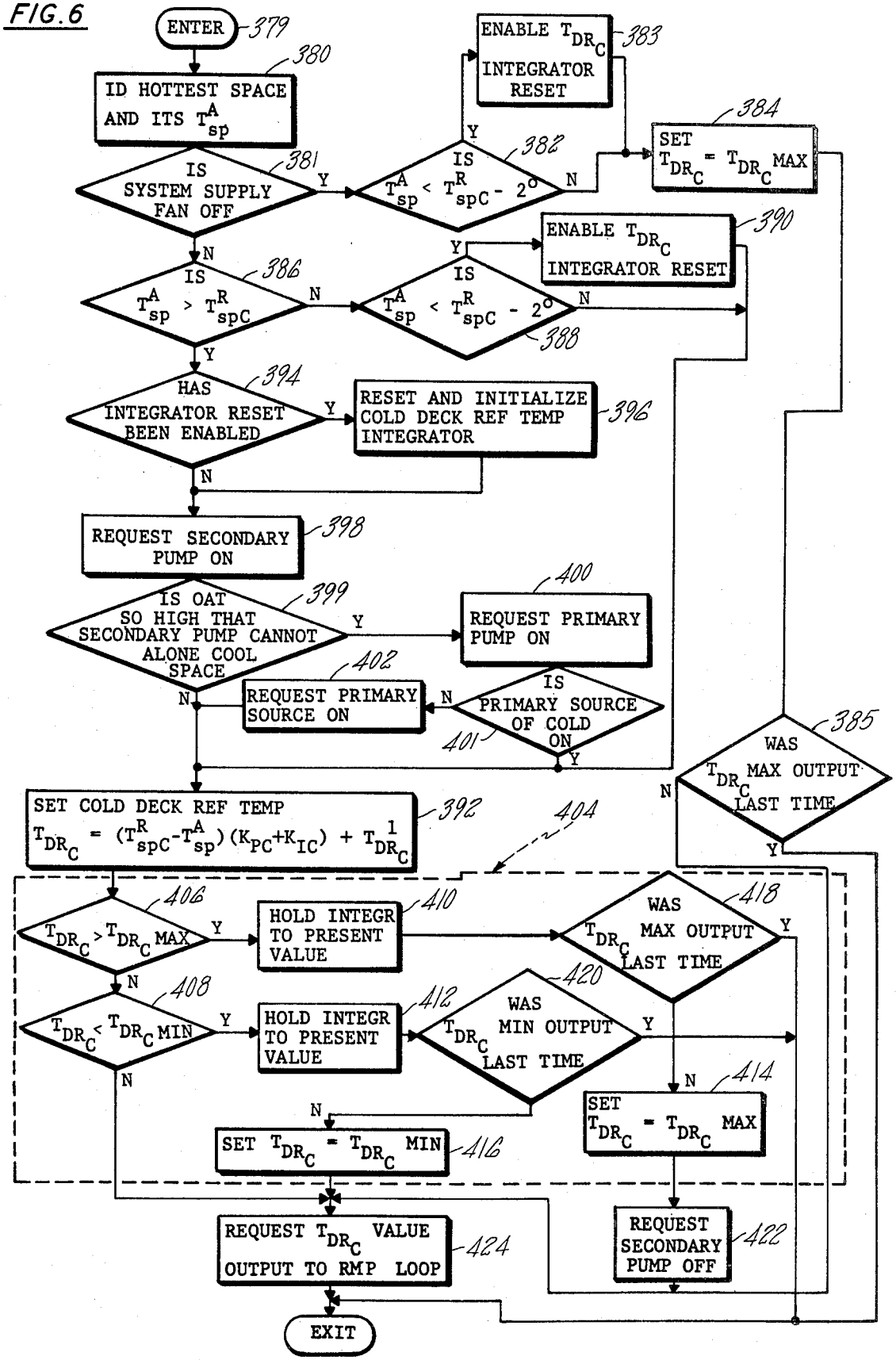
FIG. 6 is a logic flow chart diagram illustrating the processing steps incorporated in one of the control functions of the control system of the present invention.

For the condition wherein all of the sensed space temperatures are within the drift band limits, neither mechanical heating or cooling is provided. The cool discharge air from the cold deck 30 is provided through the use of mixed air within the chamber 34 (FIG. 1), as described in detail in the hereinbefore referenced, copending application, such that for the time interval between times $t_0$ and $t_1$ the HVAC system cooling is provided with the mixed air control. At time $t_1$, OAT 304 exceeds that of the hottest sensed space temperature $(T_{sp}{}^A)$ 300, and as described in the hereinbefore referenced application the OA dampers 42a are closed. Referring now to to FIG. 6, in a flow chart illustrative of the CPU control over mechanical cooling of the HVAC system, the CPU enters the flow chart at 379, and the first set of instructions 380 requests the CPU to identify the hottest space and its sensed temperature value. After identication, instructions 381 determine whether or not the system supply fan (32, FIG. 1) is off, i.e., fan failure, or shutdown resulting from maintenance or power conservation. Without the fan on the cold deck discharge air cannot be forced into the spaces and it is impractical to provide mechanical cooling. If the fan is off, instructions 382 determine whether the actual sensed temperature ($T_{sp}^A$) is more than $\Delta T_{sp}'$ degrees below the cool set point reference, i.e., within the central temperature range, and assuming that $\Delta T_{sp}' = \Delta T_{sp}'' = 2°$ F., instructions 382 determine whether $T_{sp}^A < T_{spC}^R - 2°$. The quantity $T_{spC}^R - 2°$ represents the lower threshold limit of a controlled reset function described hereinafter. When the sensed temperature value of the hottest space is more than 2° below the cool set point reference, the CPU knows that the HVAC system is not supplying mechanical cooling to the spaces. As described hereinafter, the flow chart of FIG. 6 calculates a cold deck discharge reference temperature using both proportional and integral gain constants, and if the system is not on mechanical cooling control it is desirable to allow a resetting of the CPU integral gain function to eliminate any time delay resulting from the integration time constant. At time $t_2$, instructions 382 determine that the actual sensed temperature is more than 2° from below the cool set point temperature reference and, therefore, below the cool threshold value, and CPU instructions 383 request an enable of the cold duct reference ($T_{DRC}$) integrator reset function, but do not actually reset the integrator at this time. As described hereinafter, the actual reset of the integrator occurs only after the sensed temperature exceeds the cool set point temperature reference and mechanical cooling is initiated. Following instructions 382, and 383 if necessary, the CPU instructions 384 set the cold deck discharge reference to a maximum value, i.e., the hottest temperature allowed for the deck discharge temperature so that the RMP will not activate the cooling source. Instructions 385 determine whether or not the maximum value of cold deck reference was output at the last running of the flow chart, and if it has then the CPU exits the flow chart, if not then the maximum value of the deck discharge reference is output to the RMP.

If instructions 381 determine that the supply fan is on, CPU instructions 386 next compare the actual sensed temperature of the hottest space with the cool set point reference ($R_{spC}^R$) to determine whether the sensed temperature is greater than the cool set point. At time $t_2$ the sensed temperature is not greater, and instructions 388, 390 which are identical to instructions 382, 383 described hereinbefore, determine whether the actual sensed temperature is more than two degrees below the cold set point reference and, if so, enable the reset function of the cold duct reference ($T_{DRC}$) integrator. Following instructions 388, and if necessary 390, the CPU branches to instructions 392 to calculate the value of the cold deck discharge temperature reference ($T_{DRC}$) as described in detail hereinafter. For now, it should be noted that at time $t_2$ the flow chart of FIG. 8 does not initiate mechanical cooling, i.e., turning on the cold source.

Referring again to FIG. 5, it is assumed that the sensed temperature 300 continues to increase until at time $t_3$ it is greater than the reference 306, such that the comparison of the sensed temperature with the cool set point reference temperature in instructions 386 of FIG. 6 results in a YES condition, causing the CPU to execute instructions 394 to determine whether the reset has been enabled for the cold duct reference integrator. Since the reset was enabled at time $t_2$, instructions 396 reset the integrator to an initial condition, i.e., initializing the integrator by setting the output of the integrator to a predetermined cold duct reference temperature value. The significance of the reset enable function of instructions 388, 390 and the resetting of the integrator in instructions 394, 396 is to ensure that the integrator will be reset only for a sensed temperature which has increased above the cool set point reference from a prior temperature value below the cool threshold value (310, FIG. 5), i.e., more than two degrees below the set point reference, rather than a sensed temperature which exceeds the set point reference as a result of the dithering of the controlled space temperature around the cool set point value during mechanical cooling control. Resetting the integrator for sensed space temperatures more than two degrees below the cool set point is provided so that the integral time constant will not unduly delay the control of the space to the reference set point, i.e., minimize the integrator windup time.

After resetting and initiallizing the integrator, the CPU then requests the turn on of the pump 73 for the cold source (chill water source) 72 of FIG. 1 in instructions 398. In a multiple HVAC has its own cooling coil which is supplied with chill water from a common chill water source, the source provides the chill water flow to each of the HVAC systems through a primary pump. Each HVAC has a secondary pump located within the chill water line to its respective cooling coil to provide pumping of chill water through its own cooling coil. For those situations in which the secondary pumps of the HVAC systems demanding chill water have sufficient capacity to provide the flow required by the HVAC cooling coil valve (74, FIG. 1), i.e., the degree of open valve position, it is desirable to turn off the primary pump to conserve energy since the primary pumps are typically high horsepower devices, therefore, after turn on of the secondary pump, the CPU instructions 399 determine if the OAT is above some predetermined value at which the secondary pump alone cannot provide sufficient cooling. This is to distinguish an increase in space temperature resulting from a transient temperature condition within the space from an increase due to outside ambient condition, and prevents unneccessary turn on of the primary cooling pumps such as may occur in response to a transient high temperature in the cold deck during the winter season. If the OAT is above the predetermined value CPU instructions 400-402 request a turn on of the primary pump and primary cold source. As may be obvious, in a single HVAC system involving only a single pump the distinction between primary and secondary pumps is immaterial, such that instructions 398 would request the single cold source pump on and instructions 399-402 would be eliminated.

CPU instructions 392 calculate the cold duct reference temperature in accordance with the equation:

$$T_{DRC} = \Delta T_s (K_{PC} + K_{IC}) + T_{DRC},$$

where $\Delta T_s = (T_{spC}^R - T_{sp}^A)$ is the space temperature error. The cold deck reference temperature is a function of the space temperature error between the actual sensed temperature of the hottest space and the cool set point. The space temperature error is multiplied by a proportional gain constant ($K_{PC}$) and an integral gain constant ($K_{IC}$), the values of each being determined in dependence on the transient temperature characteristics of the cold deck (30, FIG. 1) and the general HVAC system response. The values of the proportional and integral gain constant may be readily reprogrammed through keyboard entry (262 of FIG. 3) to the CPU by the maintenance personnel. Typical gain values for the cold deck control loop are $K_{PC} = 10°$ F./°F. and $K_{IC}=0.3°$ F./°F.-min. The term $T_{DRC}'$ represents either a constant cold deck temperature set point value used for initialization, i.e., the first CPU calculation of $T_{DRC}$ in a given control time period, or the summation of the fixed set point initialization temperature and the integral of the space temperature error over the time period between initialization and the present calculation. A typical value of $T_{DRC}'$ may be 60° F., and as with the proportional and integral gain constants the value may be reprogrammed through keyboard entry depending upon seasonal or even daily outside ambient conditions. The CPU provides a discrete integral term, i.e., the product of the integral gain times the space temperature error over the fixed time interval between successive running of the cooling flow chart of FIG. 6, which may be typically five minutes. The CPU integrates the product of the space temperature error and the integral gain over the five minute interval to provide a discrete integration value which is summed with the proportional error value and $T_{DRC}'$.

The calculated value of $T_{DRC}$ is next compared with stored max/min reference values of the cold deck reference discharge temperature stored in the CPU RAM (FIG. 3) in a subroutine 404. The calculated value is compared with the maximum and minimum value limits in instructions 406, 408. The max/min limit values are determined as a function of the characteristics of a given terminal reheat HVAC installation, or on the temperature conditions on a given day, and may be readily changed by the maintenance operator at the central CPU through entrance by the keyboard 262. If the calculated value of the cold deck reference discharge temperature exceeds either of the max/min limits, instructions 410, 412 require the integrator function to maintain the present value of cold deck reference discharge stored in the integrator, and instructions 414, 416 requests the CPU to set the presently calculated value of $T_{DRC}$ to the corresponding maximum or minimum value. If the limits were exceeded on two consecutive runs of the cooling flow chart, instructions 418, 420 require the CPU to exit the program to save time. At the end of the subroutine 404, if the calculated $T_{DRC}$ value is set equal to the maximum limit, instructions 422 request that the HVAC water pump (secondary pump in a multiple HVAC system fed from a common primary pump and common cold source) be turned off. After establishing the value of $T_{DRC}$, and if necessary requesting the turn off of the chill water pump, instructions 424 request the CPU to read out the established value of the $T_{DRC}$ to the RMP. It should again be noted that instructions 399-402 are required for a multiple HVAC system. Instructions 400 and 402 request a turn on of the primary pump and primary (common) cold source for those situations in which none of the plurality of HVAC systems had previously required cooling and the primary pump and source had been turned off through a separate CPU program listing which is not part of the present invention. Therefore, the flow chart of FIG. 6 does not provide for the turn off of the primary pump and source, but only the turn on, and as stated hereinbefore, in a single HVAC system having its own cooling source instructions 399-402 would be eliminated.

Figure 10:
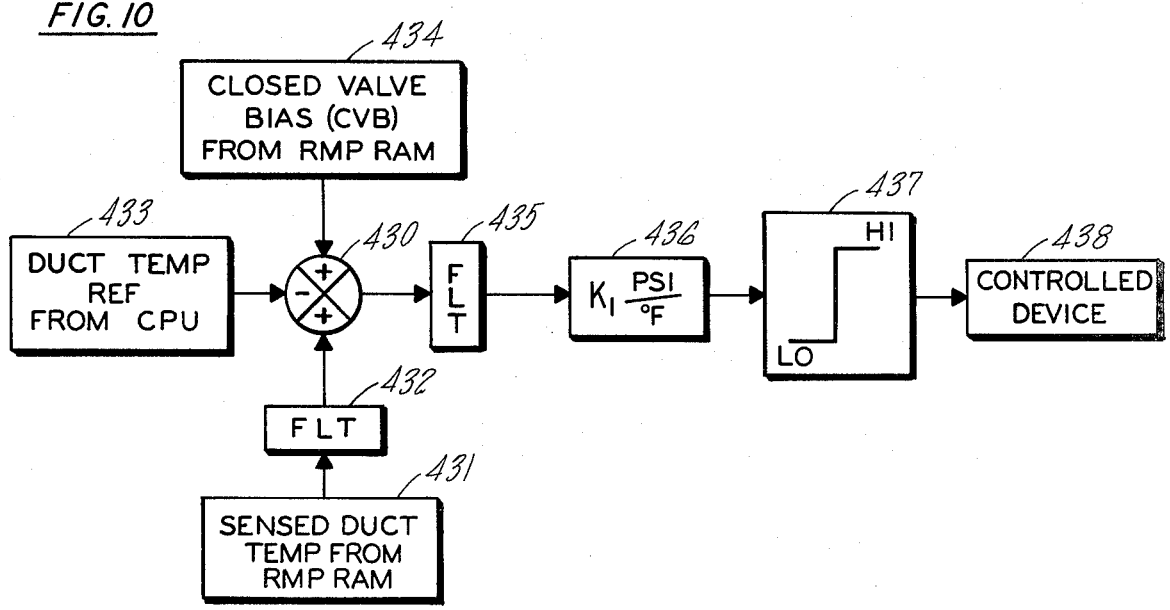
FIG. 10 is a simplified block diagram of a proportional gain control loop used in the control system of the present invention.

The RMP compares the set cold deck reference discharge temperature value from the CPU to an actual sensed cold deck discharge temperature value to provide a simple, proportional loop control over the corresponding controlled device within the HVAC system, i.e., the pneumatic actuator 76 which controls the chill water valve 74 of FIG. 1. Referring to FIG. 10, in a simplified block diagram illustration of the proportional control loop provided by the RMP, a summing junction 430 provides a summation of the difference temperatures between: the sensed cold deck discharge temperature 431 (provided from the cold deck discharge temperature sensor 128 of FIG. 1) presented to the summing junction through a digital low pass filter 432 of a type known in the art which eliminates high frequency noise pickup, the set value of the cold deck reference discharge temperature ($T_{DRC}$) 433 presented from the CPU, and a closed valve bias (CVB) signal 434 stored in the RMP RAM (208, FIG. 2). The output signal from the summing junction is presented through a second low pass digital filter 435 to the input of a proportional gain circuit 436, which provides a proportional gain and scale factor conversion from temperature degrees to psi. The output signal from the circuit 436 is presented to a threshold limit circuit 437 which provides the maximum and minimum position limits prescribed for the corresponding controlled device and which may be subject to change through CPU programmed change of the RMP. The output signal from the limit circuit 437 is presented to the input of the respective controlled device 438, which for the cooling flow chart of FIG. 6 represents the pneumatic actuator 76, to provide a change of position for the valve 74. The CVB is a constant bias signal which provides an operating reference point for the range of operation of the controlled device, i.e., for the pneumatic actuator 76 which opens the valve 74 to actuate the cooling coil 70 only in response to unidirectional temperature errors above the set value of $T_{DRC}$, the CVB ensures a fully closed valve position for a temperature error at, or below the set reference discharge temperature value.

The cooling flow chart of FIG. 6 is executed at periodic intervals, and it actuates mechanical cooling only when the comparison of sensed space temperatures to the space cool set point reference temperature in instructions 386 indicates that the sensed temperature is greater than the cool set point reference. At that time the cooling source pumps are turned on. At all other times, the CPU provides an updated cold deck reference temperature value based on the most recent sensed temperature values of the hottest space temperature. Referring again to FIG. 5, the cooling flow chart sets the cold deck reference temperature in dependence on the sensed temperature 300, which represents the hottest space at time $t_3$. At times $t_4$ the sensed temperature 300 levels off and is exceeded by the sensed temperature 301, and the cooling flow chart of FIG. 6 identifies the space 95 as being the hottest. The calculation of the cold deck reference temperature is dependent on the magnitude of the space temperature error, such that the increased error provided by the sensed temperature 301 results in a low cold deck discharge reference temperature value and a corresponding increase in cold source output to the cooling coil (70 of FIG. 1) until such time as the sensed temperature 301 is turned around and decreases at time $t_5$ to a value less than the cool set point reference, but within the two degree band between the cool set point reference 306 and the cool threshold value 310. The temperature in the hottest space is then controlled around the cool set point reference by constantly modulating the cool deck discharge temperature, until at time $t_6$ it is assumed that the cooling load diminishes, and all of the sensed temperatures (300-302)

drop below the cool set point reference and the cool threshold value. With the sensed temperatures within the temperature drift band established by the cool set points 306, 308 the mixed air control, described in the hereinbefore reference copending application, is actuated to attempt temperature regulations within all of the spaces to the use of a determined mixture of OA and RA. As the sensed space temperature continues to drop, instructions 392 of FIG. 6 provides successive update calculations of the cold deck reference discharge temperature, causing the reference value to continually increase until it it equal to the maximum value whereupon instructions 422 request that the chill water pump (secondary pump) be turned off, shutting down all mechanical cooling.

As described hereinbefore, the prior art terminal reheat HVAC system provides mechanical heating to each of the spaces 94–96 individually, i.e., heating of each space is provided through an associated one of the heater assemblies 102-104 in response to a space temperature error provided from the corresponding one of the space thermostats 90-92. Each of the thermostats is under the individual control by persons within the space. The heaters are installed in the individual spaces rather than a central heating source which provides heat to all of the spaces simultaneously, as in a multizone, or dual duct type of HVAC system, such that central control of the individual heaters is impractical. Since from the standpoint of energy conservation it is desirable to limit the heat output from all of the heaters 102-104 to reduce the HVAC system energy consumption and prevent the situation described hereinbefore where the air handler cooling coil and the individual space heating coils fight each other in providing space temperature regulation, the present invention provides controlled actuation of the output from the common heat source 110 (FIG. 1) to control the heating output capacity from the space heating coils (106-108).

Figure 7:
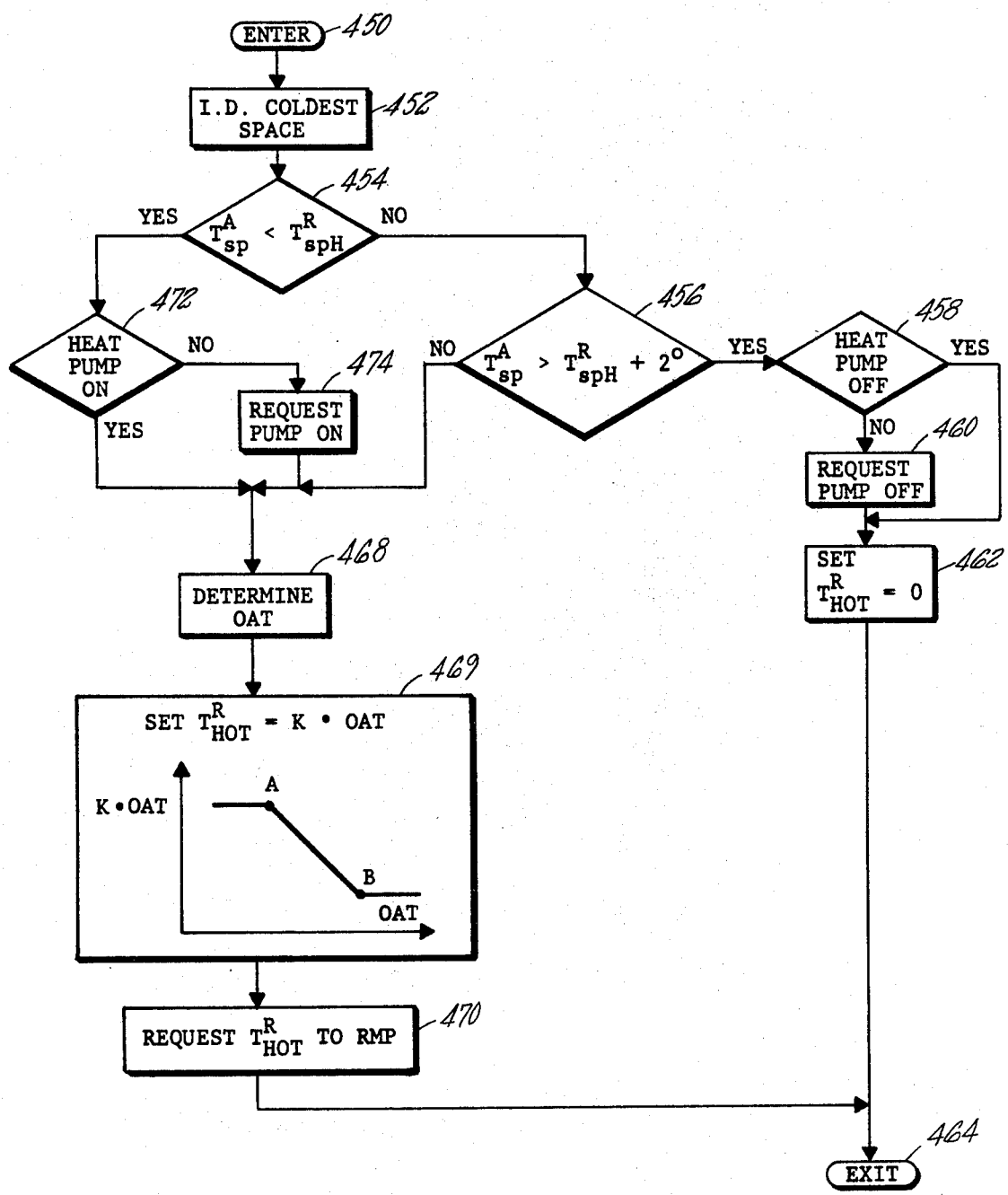
FIG. 7 is a logic flow chart diagram illustrating the processing steps incorporated in another control function of the control system of the present invention.

Referring now to FIG. 7, in a flow chart illustrative of the central control of mechanical heating in a terminal reheat HVAC system, the CPU enters the program listing at 450 and instructions 452 identify the coldest space and its sensed temperature by scanning the sensed space temperature values stored in the RMP RAM (208, FIG. 2). After identifying the coldest space, instructions 454 request a comparison of the coldest space actual sensed temperature ($T_{sp}{}^A$) with the space heat set point reference ($T_{spH}{}^R$) to determine whether the actual sensed temperature is less than the heat set point reference value. At time $T_8$ (FIG. 5) all of the sensed temperatures 300-302 are at a sensed temperature value higher than the heat set point reference 308 and the heat threshold value 312, i.e., $T_{sp}{}^A > T_{spH}{}^R + 2°$. At time $t_8$, therefore, the comparison instructions 454 indicates that the sensed temperature is greather than the heat set point reference, and instructions 456 determine whether the coldest sened temperature is greater than the heat threshold value. At time $t_8$ it is, and instructions 458 next determine whether the heat source pump (112, FIG. 1) is off, the CPU recognizing the energized/deenergized status of the heat source pump from the presence or absence of a gate signal on the line 184 from the RMP. If the pump is on, instructions 460 command the RMP to turn off the pump, and the RMP responds by removing the gate signal on the line 184 to the voltage controlled switch 178 (FIG. 1). Instructions 462 set the heat source (110, FIG. 1) discharge temperature reference ($T_{HOT}{}^R$) to zero. The RMP which controls the discharge temperature through a proportional gain loop similar to that shown in FIG. 10, compares the sensed heat source discharge temperature ($T_{HOT}{}^A$) signal on the line 188 with the zero value of $T_{HOT}{}^R$, and turns off the heating apparatus of the heat source, thereby shutting down mechanical heating in all of the spaces. Following instructions 462 the CPU exits the program listing of FIG. 7 at 464.

At time $t_9$, FIG. 5 illustrates a sensed temperature 302 from the coldest space (96, FIG. 1) as being at a sensed value less than $T_{spH}{}^R + 2°$, i.e., a sensed temperature value within the two degree band between the heat set point reference and the heat threshold. With the execution of the program listing of FIG. 7 at time $t_9$, the result of the comparison CPU instructions 456 is a NO condition, and the CPU sets the heat source discharge temperature reference as a determined function of the outside air temperature (OAT), or $T_{HOT}{}^R = K \cdot OAT$, and reads out the calculated $T_{HOT}{}^R$ value to the RMP. This is accomplished in the program listing through instructions 468-470 which request a determination of an OAT value stored in the RMP RAM. The value of $T_{HOT}{}^R$ is then set equal to the OAT value times a proportional gain constant (K) whose value is determined based on building insulation characteristics, and the HVAC system heating capacity, and which is reprogrammable in the CPU through operator entry via the keyboard (262, FIG. 3). Typically, the value of the proportional gain K is defined over ranges, or increments of OAT as illustrated qualitatively by the transfer function in the block for instructions 470, resulting in a higher value of $T_{HOT}{}^R$ at the lower OAT values, and a continuing decrease in the reference discharge value as the OAT increases up to some minimum value shown generally at B of the illustrated transfer function. After setting the value of $T_{HOT}{}^R$ as a function of OAT the CPU transmits the calculated value to the RMP through instructions 470 and exits the program at 464. The RMP compares the $T_{HOT}{}^R$ value from the CPU with the sensed discharged temperature $T_{HOT}{}^A$ on the line 184 (FIG. 1) in a subroutine and turns on the heat source 110 in response to a value $T_{HOT}{}^R$ greater than $T_{HOT}{}^A$.

With the coldest sensed space temperature within two degrees band of the heat set point reference, i.e., less than the heat threshold value, each periodic execution of the flow chart of FIG. 7 results in an update of the heat source reference discharge temperature as the function of any change in OAT, however, the heat source pump 112 is not turned on, preventing any mechanical heating of the spaces by heaters 102-104, until the sensed space temperature is less than the heat set point reference. At time $t_{10}$ in FIG. 5, the sensed temperature 302 is less than the heat set point, such that the instructions 454 of FIG. 7 provide a YES condition. CPU instructions 472 next determine whether the heat pump (112, FIG. 1) is on, and if not on then instructions 474 request the RMP to turn on the pump. Following the execution of instructions 472, 474, the CPU executes the instructions 468-470 described hereinbefore.

Following the request by the CPU instructions 474 to turn on the primary heat pump, the RMP 200 of FIG. 2 responds to the CPU request by providing the discrete heat signal stored in the RAM 208 through the DMPX's 228, 231, and through the line 182 to the gate input of the voltage controlled switch 178 of FIG. 1. The switch 178 responds by providing the $V_{AC}$ source voltage to the pump 112 through the automatic (A) contact of the switch assembly 180. The pump when energized provides hot water flow through the lines 114 to each of the values 116–118 associated with the heaters 102–104. The pump 112 remains energized as long as any of the sensed space temperatures are less than the heat threshold value (the heat set point reference plus two degrees) as illustrated in FIG. 7, instructions 454, 456, where the heat pump is turned off only for the condition wherein $T_{sp}{}^A > T_{spH}{}^R + 2°$.

Figure 8:
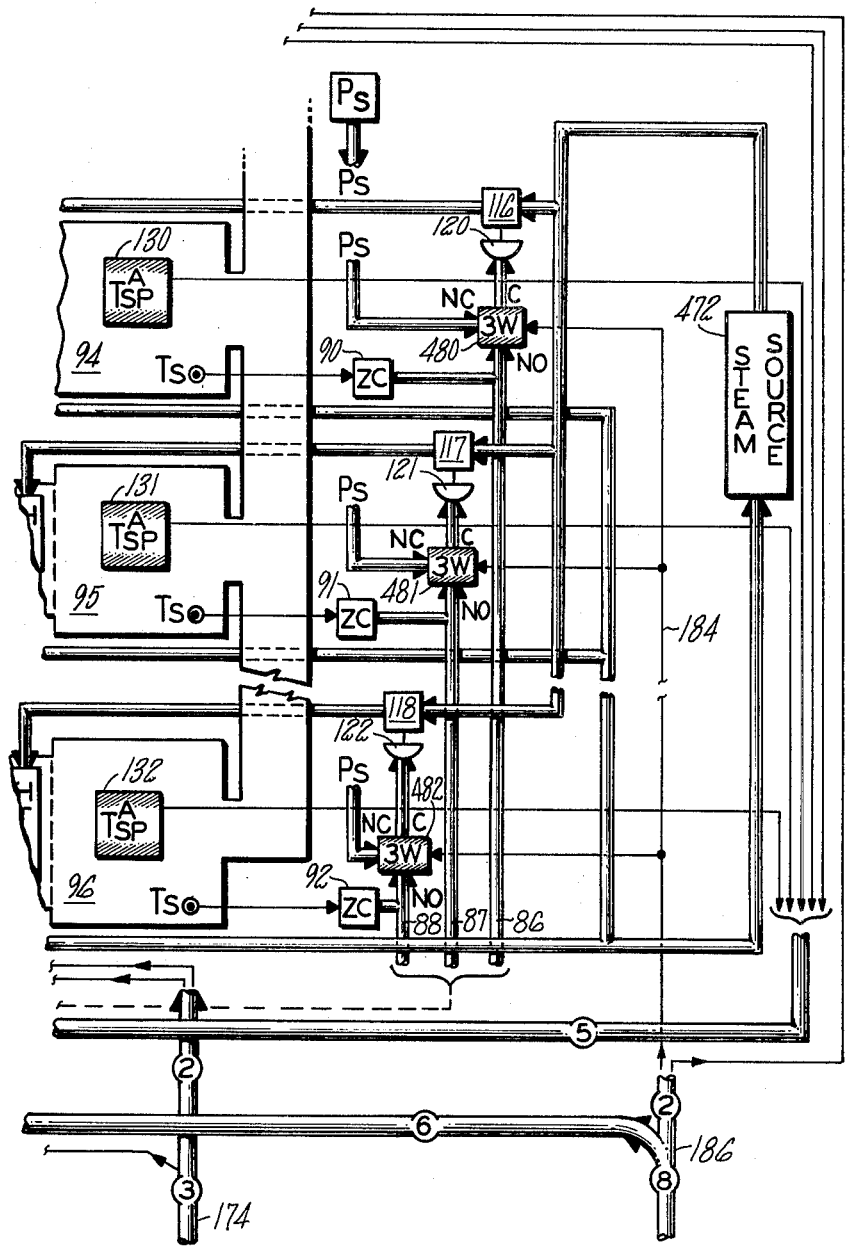
FIG. 8 is a partial schematic block diagram of an alternative terminal reheat HVAC system with installed interface apparatus for both control and sensing of HVAC performance in accordance with the present invention.

The flow chart of FIG. 7 provides mechanical heating only in response to a sensed space temperature less than the heat set point reference, and performs the control over the individual heaters in each of the spaces through control of the flow of the heating medium, i.e., hot water, through a primary heat pump 112, and the operation of the heat source 110. Alternative methods of controlling the application of mechanical heating within a given HVAC system are provided when required by the particular characteristics of a given system. An alternative embodiment of the mechanical heating control interface is shown in FIG. 8 for a terminal reheat HVAC system which uses steam heat supplied space heat radiators directly from a steam source 472 (such tht there is no heat source pump), three way valve 480–482, identical to those described hereinbefore, are installed in the pneumatic control lines 86–88 from the corresponding space thermostats 90–92. The valves are connected to the existing pneumatic lines at the common (C) and normally open (NO) ports. The C port of each is connected to the associated one of the pneumatic actuators 120–122, and the normally closed (NC) port of each is connected to the system pressure source (Ps) which provides a determined bias pressure signal representative of a maximum hot space temperature error signal, i.e., a "no heat" condition. Each of the values 480–482 receives a discrete input signal from the RMP on the line 184. In the absence of a discrete sigal on the line in response to a CPU request to actuate mechanical heating, each of the valves provides a pneumatic signal path through the C and NO ports, allowing control of the pneumatic actuators 120–122 by the corresponding space thermostats 90–92. Conversely, the presence of a discrete signal on the lines 184 in response to a CPU request to turn off mechanical heating, causes each of the valves to change position, providing a pneumatic signal path between the NC and C ports which results in the connection of the $P_S$ source to the input of each of the actuators 120–122. The actuators respond to the bias pressure signal from the $P_S$ source by closing the associated valves 116–118.

Figure 9:
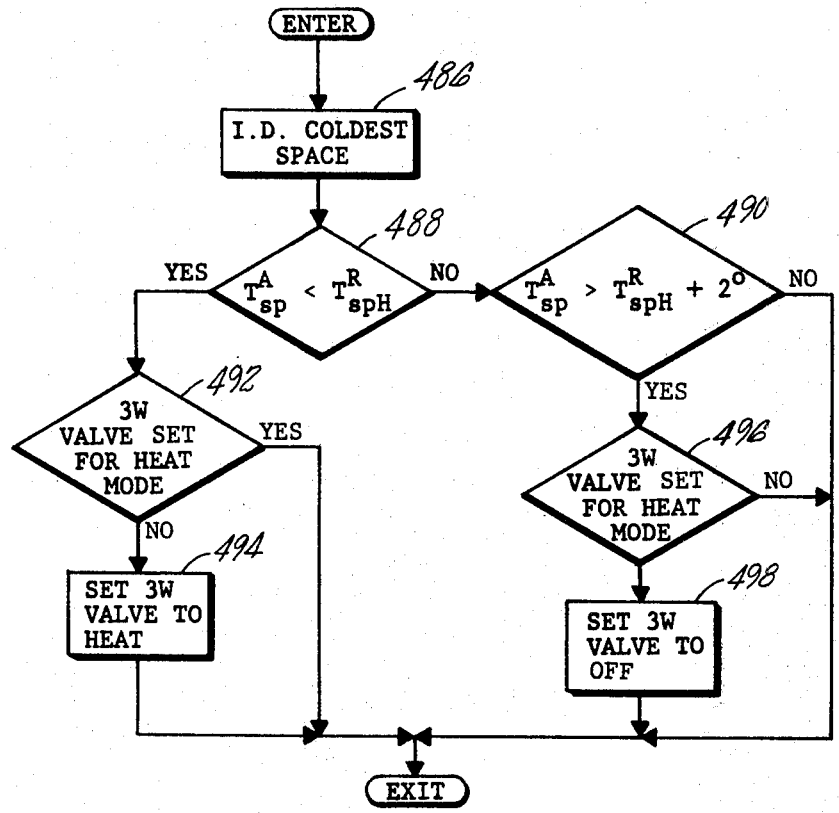
FIG. 9 is a logic flow chart diagram illustrating the processing steps incorporated in still another control function of the control system of the present invention.

Control over the valves of FIG. 8 is provided through a CPU program listing illustrated in FIG. 9, wherein CPU instructions 486 identify the coldest space and its sensed temperature. Instructions 488, determine whether the actual sensed temperature of the coldest space is either less than the heat set point reference and if not, then instructions 490 determine if the sensed temperature is above the heat threshold value (the heat set point reference plus two degrees) in the same manner as instructions 454, 456 of FIG. 7. If the actual sensed temperature is less than the heat set point reference, then instructions 492 determine if the three way valves are set for the heat mode, i.e., the thermostats 90–92 are controlling the pneumatic actuators 120–122. If the valves are set for the heat mode the CPU exits the program, otherwise instructions 494 request the RMP to set the three way valve to the heat mode. It should again be noted that the setting of the three way valves to the heat modes is provided through the absence of a discrete signal on the line 182, thus providing a fail safe system in that a failure in the RMP results in a restoration of the existing HVAC control loops over the individual heaters. If instructions 490 determine that the sensed space temperature is greater than the heat threshold value then instructions 496 and 498 insure that the three way valves are set to the off position, i.e., no mechanical heating.

Figure 11:
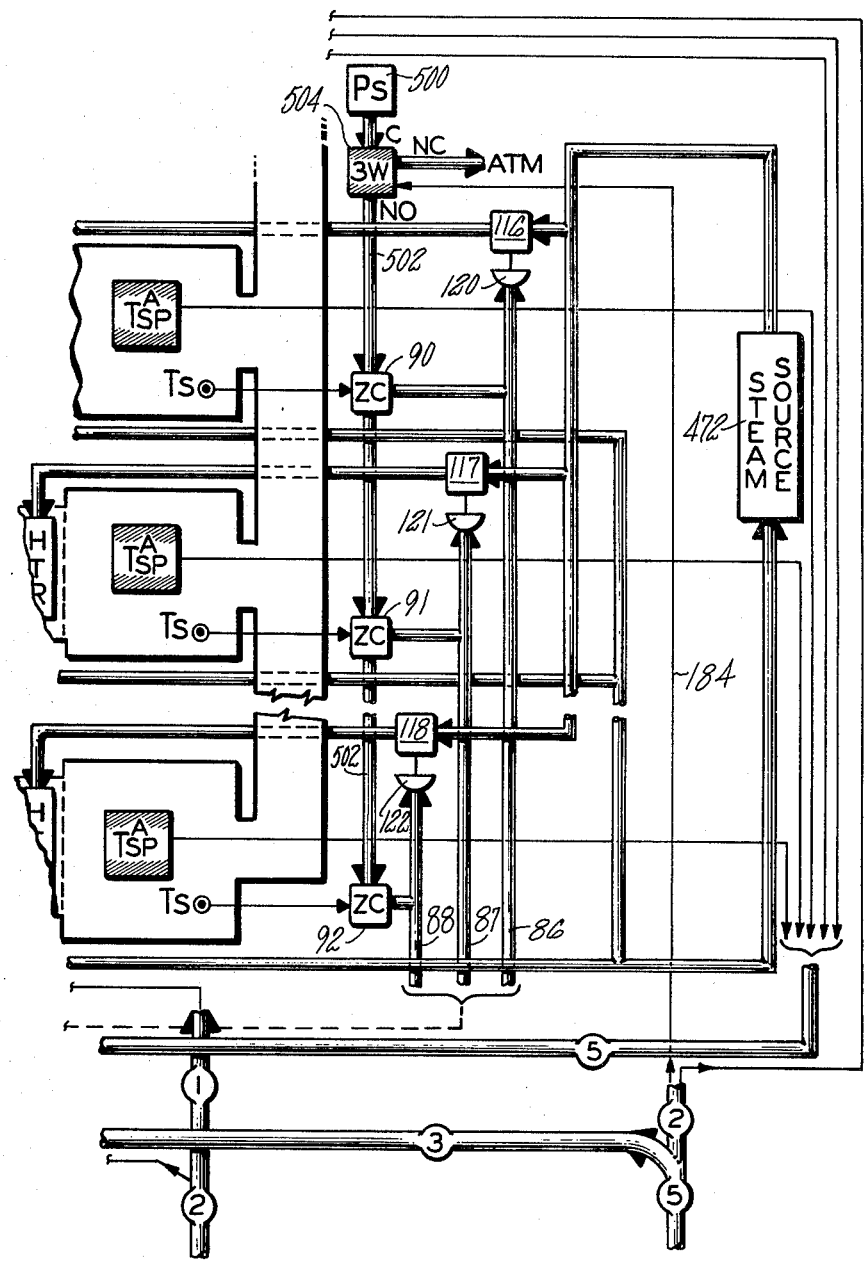
FIG. 11 is a partial schematic block diagram of still another type of terminal reheat HVAC system together with installed interface apparatus for both control and sensing of performance of the HVAC system in accordance with the present invention.

The steam heat type of terminal reheat HVAC system of FIG. 8 is a normally open type control system, i.e., in the absence of a pneumatic pressure signal from the space controller 90–92 the valves 116 through 118 are normally open permitting steam heat from the source 472 to the respective space heat radiators. The valves require a pneumatic signal input to the actuators 120–122 in order to close the valves and shut off the steam flow. For a steam heat system employing normally closed valves, i.e., the valves 116 through 118 are normally closed in the absence of a pneumatic signal to the corresponding actuators 120–122, a simplified, alternative interface embodiment between the HVAC system and the RMP may be provided as shown in FIG. 11, where the space controllers 90–92 are connected to the system pressure source ($P_S$) 500 through a pressurized pneumatic line 502. The control interface includes the installation of a single three-way valve 504 into the pneumatic line 502 at the common and and normally open ports. The normally closed ort of the three-way valve is vented to atmosphere. The RMP provides the discrete control signal on the line 184 to the valve 504 to control the valves position in the same manner as the valves 480–482 of FIG. 8. In response to instruction 498 of FIG. 9, the RMP provides a discrete signal on the line 184 to the valves causing the valves to respond by connecting the common port to the normally closed port, thereby venting the pressure source signal to atmosphere and providing a zero psi input signal to the space controllers 90–92. The zero psi signal output from the contrlllers results in a "no heat" condition response by the pneumatic actuators 120–122 which close the valves 116 and through 118, thereby shutting off steam flow and turning off the system mechanical heating. Conversely, in response to instructions 494 of FIG. 9 requesting a setting of the valve to the heat mode, the RMP removes the discrete signal on the line 184 causing the valve to restore the connection between the common port and normally open port, thereby connecting the pressure source 500 to the space controller 90–92 and permitting mechanical heating in response to space demand.

The system control of the present invention provides an energy efficient control which limits actuation of the mechanical cooling and heating sources in the terminal reheat HVAC systems. The controlled actuation ensures that the characteristic fighting of prior art terminal reheat systems wherein the cold deck discharge temperature is provided irrespective of the demand from the temperature controlled spaces, and in many instances is reheated in the respective space heating apparatus in response to the individual space control signals. The controlled shut off of mechanical heating at the heat source prevents unnecessary reheating of the cold deck discharge air unless the sensed space temperatures are below a predetermined space heat set point temperature reference. Conversely, mechanical cooling is provided only in response to the sensed space temperatures exceeding a cool set point temperature reference. The control of the mechanical heating is provided through a number of alternative interface embodiments, each dependent on the particular type of terminal reheat HVAC heating source, such that any existing terminal reheat HVAC system may be made compatible for interfacing with the central control of the present invention. Similarly, although the invention has been shown and described with respect to exemplary embodiments thereof, it should be understood by those skilled in the art that the foregoing and various other changes, omissions and additions in the form and detail thereof may be made therein and thereto without departing from the spirit and the scope of the invention.

Having thus described typical embodiments of our invention, that which we claim as new and desired to secure by Letters Patent is:

1. Apparatus for controlling a terminal reheat HVAC system which regulates the temperature in a plurality of temperature controlled spaces by reheating, as necessary with heating apparatus associated with each space, cool discharge air provided to each space from a common cooling source, each space heating apparatus being energized from a common energy source and each actuated, individually, in response to command signals from a related heating apparatus control within the associated space, the control apparatus comprising:

plurality of space temperature sensor means, one for each temperature controlled space, each providing an actual space temperature signal for the associated space;

cooling source temperature sensor means for providing an actual cool discharge air temperature signal;

source control means, including a common cooling source control means and a common energy source control means, each adapted for selectable control of the associated source for providing, when selected, exclusive actuation of the associated source in response to cooling source and energy source actuating gate signals presented thereto; said cooling source control means being further responsive to said actual cool discharge air temperature signal and to a cool air reference discharge temperature signal presented thereto, for providing control of the cool discharge air temperature in response to the presence of said cooling source actuating gate signal in dependence on the difference temperature between said actual cool air discharge temperature signal and said cool air reference discharge temperature signal; and electronic processing means, connected to said cooling source and to said heating source control means and responsive to said actual space temperature signals, said processing means having a memory for storing signals including a proportional gain signal, an integral gain signal, a heat set point temperature signal and a cool set point temperature signal, said heat and cool set point temperature signal defining the low tempeature limit and the high temperature limit respectively of a temperature drift band, said processing means comparing said actual space temperature signals to said temperature drift band limits for providing said energy source actuating signal in response to an actual space temperature signal below said heat set point temperature signal and for providing said cooling source actuating signal in response to an actual space temperature signal above said cool set point temperature signal, said processing means further providing in the presence of said cooling source actuating gate signal said cool air reference discharge signal at a value proportional to the time integral of the difference magnitude between said cool set point temperature signal and the highest value actual space temperature signal multiplied by said integral gain sigal, in summation with the product of said difference magnitude multiplied by said proportional gain signal.

2. The apparatus of claim 1, wherein said electronic processing means further comprises:

means for successively sampling periodically and registering in said memory, successively sampled values of said actual space temperature signals, said processing means providing in each sampling period said time integral of the product of said integral gain signal and said difference magnitude in each sampling period, integrated over the time interval of the related sampling period, said processing means accumulating a summation thereof in said memory, said processing means providing said cool discharge air reference temperature signal in each sampling period at a magnitude in dependence on the product of said difference magnitude related to said sampling period multiplied by said proportional gain signal in summation with said time integrals accumulated in said sampling.

3. The apparatus of claim 1, further comprising:

means responsive to operator control for providing to said memory of said processing means, parameter signals representative of said heat set point temperature signal, said cool set point temperature signal, said proportional gain signal, and said integral gain signal in response to selective operation thereof.

* * * * *

UNITED STATES PATENT AND TRADEMARK OFFICE
CERTIFICATE OF CORRECTION

PATENT NO. : 4,253,153
DATED : February 24, 1981
INVENTOR(S) : William W. Bitterli, John E. Games & David M. Healey It is certified that error appears in the above—identified patent and that said Letters Patent is hereby corrected as shown below:

Column 16, line 19 after "HVAC" insert --system where each HVAC--.

Column 17, line 23 after "RAM" insert --272--.

Column 17, line 44 after "HVAC" insert --chill--.

Column 19, line 12 "it it" should be --it is--.

Column 19, line 57 "sened" should be --sensed--.

Column 22, line 41 delete "and".

Column 24, line 6 "tempeature" should be --temperature--.

Column 24, line 22 "sigal" should be --signal--.

Signed and Sealed this

Twenty-third Day of June 1981

[SEAL]

Attest:

RENE D. TEGTMEYER

Attesting Officer    Acting Commissioner of Patents and Trademarks